United States Patent
Levison

[19]

[11] Patent Number: 6,008,815
[45] Date of Patent: Dec. 28, 1999

[54] METHOD FOR ADAPTIVE POLYGON RENDERING WITH FAST OPERATION SPEED OF INTERPOLATION

[75] Inventor: Jacob Levison, Tokyo, Japan

[73] Assignee: NEC Corporation, Tokyo, Japan

[21] Appl. No.: 08/738,111

[22] Filed: Oct. 25, 1996

[30] Foreign Application Priority Data

Feb. 16, 1996 [JP] Japan .................................. 8-029060

[51] Int. Cl.⁶ .................................................. G06T 5/00
[52] U.S. Cl. .................... 345/428; 345/147; 345/150; 345/155; 345/431
[58] Field of Search .................................. 345/428, 431, 345/432, 147, 150, 153, 155

[56] References Cited

U.S. PATENT DOCUMENTS

| | | | |
|---|---|---|---|
| 4,291,380 | 9/1981 | Rohner | 364/522 |
| 5,278,949 | 1/1994 | Thayer | 345/426 |
| 5,353,389 | 10/1994 | Fiasconaro | 345/419 |
| 5,566,284 | 10/1996 | Wakayama | 345/430 |
| 5,861,871 | 1/1999 | Venable | 345/150 |

OTHER PUBLICATIONS

"A Fast Shaded–Polygon Renderer", R. W. Swanson et al., Computer Graphics, vol. 20, No. 4, (1986), pp. 95–101.

*Primary Examiner*—Mark R. Powell
*Assistant Examiner*—Motilewa Good-Johnson
*Attorney, Agent, or Firm*—Foley & Lardner

[57] ABSTRACT

In a method of polygon rendering, the coordinate and color spans of each polygon triangle are evaluated whether they are above or equal to a predetermined threshold value. A first bit resolution is applied to the polygon rendering, when the coordinate and color spans are above or equal to the predetermined threshold value. A second bit resolution lower than the first bit resolution is applied to the polygon rendering, when the coordinate and color spans are below the predetermined threshold value.

4 Claims, 8 Drawing Sheets

METHOD FOR ADAPTIVE POLYGON RENDERING WITH FAST OPERATION SPEED OF INTERPOLATION

BACKGROUND OF THE INVENTION

This invention relates to a method of polygon rendering for use in three-dimensional (3D) computer graphics(CG).

A conventional method of polygon rendering of the type described includes coordinate rasterization, pixel shading, hidden surface removal, and the like. For example, an application of such polygon rendering is in the classical three-dimensional (3D) graphics pipeline which comprise the following three steps: vertex shading, coordinate transformation and polygon rendering. Herein, the invention is applied for implementation of the final step, polygon rendering. Another example is font rendering where the structure of a character is rendered to either a display or a printing device.

Conventionally, polygon rendering is performed with a fixed bit resolution, determined by worst case consideration in order to avoid numerical overflow. An example of such method is disclosed in "A Fast Shaded-Polygon Renderer", by R. W. Swanson and L. J. Thayer, Computer Graphics 20, 4, 1986, (Proceedings of SIGGRAPH 1986), pp. 95–101.

In the interim, the majority of the coordinate and color spans are small in which low bit resolution offers sufficient accuracy in many computer graphics scenes. However, in the conventional method of polygon rendering, no consideration is made about reduction of the required number of processing cycles by first measuring the coordinate and color spans and then selecting an appropriate word size. In other words, no consideration is made as regards acceleration of interpolation process resulting from the reduction of the required number of processing cycles.

SUMMARY OF THE INVENTION

It is therefore an object of the present invention to provide a method of polygon rendering in which the required number of processing cycles is reduced to achieve the acceleration of interpolation process.

Other objects of the present invention will become clear as the description proceeds.

According to an aspect of the present invention, there is provided a method for adaptive polygon rendering, where the applied fixed-point bit resolution is adapted to the size of the polygon, the method comprising the steps of: calculating the coordinate and color span of the polygon, where the coordinate span is the range of the X, Y, and Z axes whithin which the polygon is defined and where the color-span is the range of the Red, Green, and Blue axes whithin which the polygon is defined; comparing the coordinate and color span with a predetermined threshold value; applying a first bit resolution to the adaptive polygon rendering process, if a single coordinate and color span is above or equal to the predetermined threshold value; and applying a second bit resolution lower than the first bit resolution to the adaptive polygon rendering process, if the single coordinate and color span is below the predetermined threshold value.

The rendering process may comprise interpolation of the four axes Z, Red, Green, and Blue across the polygon.

The predetermined threshold value may be 128. The first bit resolution may be 32 bit resolution while the second bit resolution may be 16 bit resolution.

DETAILED DESCRIPTION OF THE PREFERRED EMBODIMENT

Figure 1:
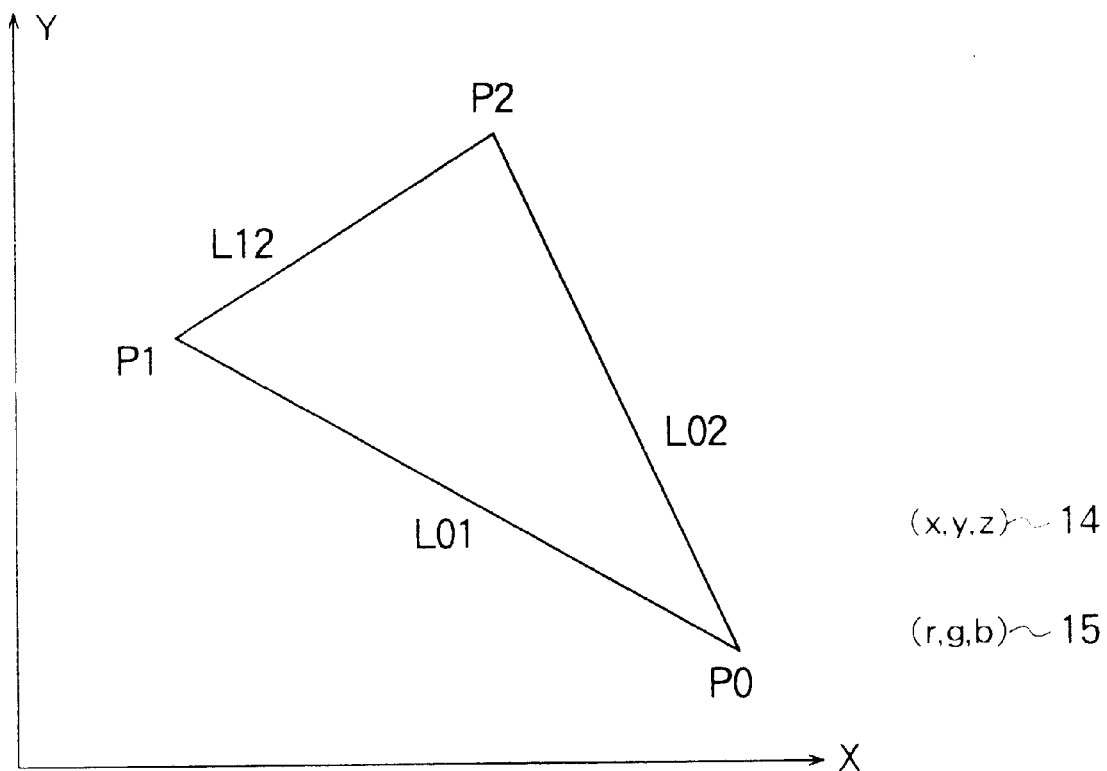
FIG. 1 is a view illustrating a triangle which is used for explaining coordinate and color spans in a method of polygon rendering.
Figure 2A:
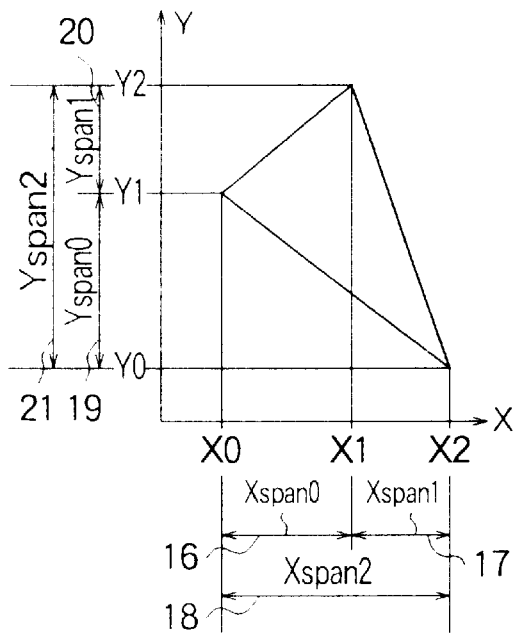
FIG. 2A is a view illustrating X-Y plane in the coordinate and color spans.
Figure 2B:
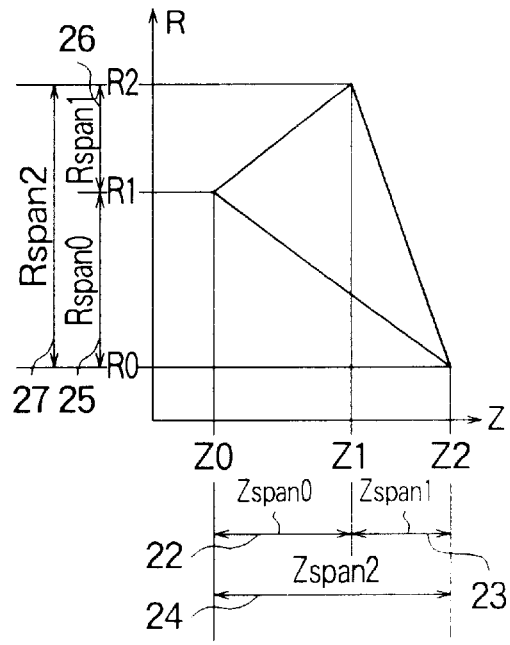
FIG. 2B is a view illustrating Z-R plane in the coordinate and color spans.
Figure 2C:
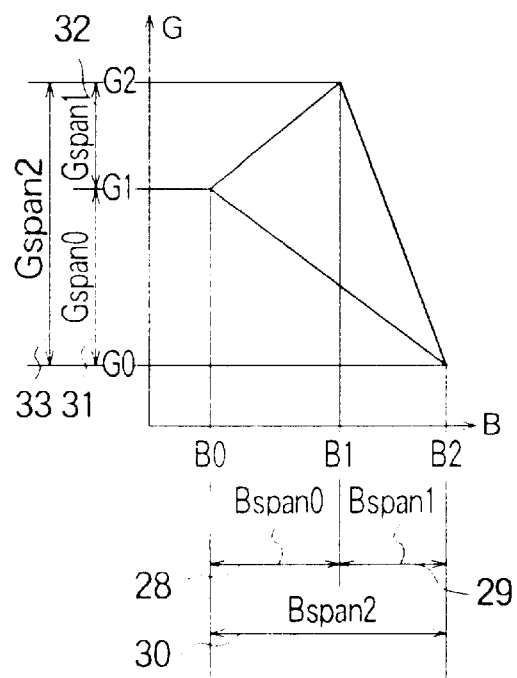
FIG. 2C is a view illustrating G-B plane in the coordinate and color spans.
Figure 3:
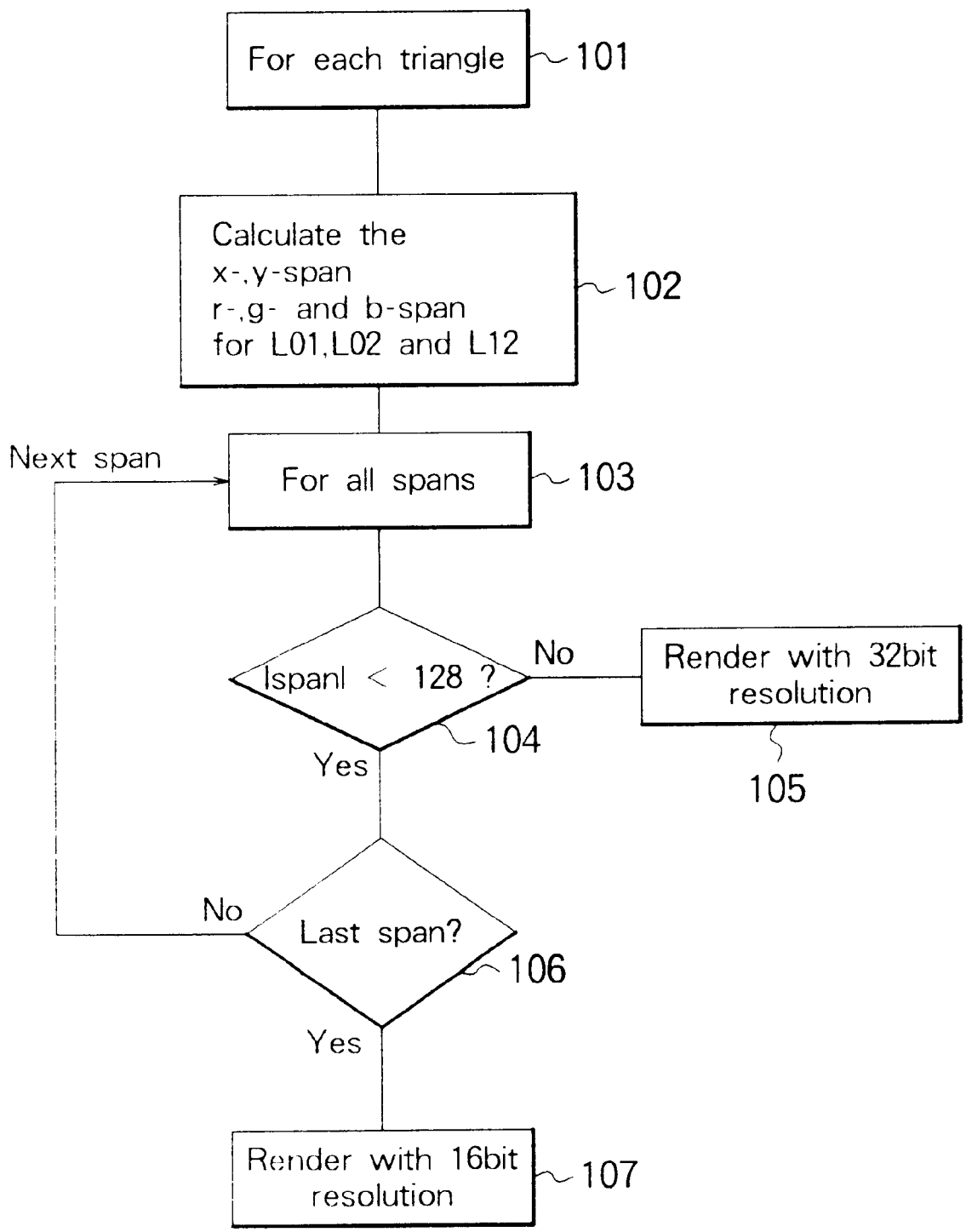
FIG. 3 is a flow chart illustrating the bit resolution adaptation in a method of polygon rendering according to a preferred embodiment of the present invention.

Referring to FIGS. 1 to 3, description is made about a method of polygon rendering according to an embodiment of the present invention.

In the method of polygon rendering according to the embodiment of the present invention, the applied fixed-point bit resolution is adapted to the size of the polygon. Considering a triangle as the polygon, all the coordinate and color span of the triangle are compared with a predetermined threshold value. If the coordinate and color span is above or equal to the threshold value, high bit resolution is applied for interpolation of the four axes Z, Red, Green, and Blue, otherwise, low bit resolution is applied.

Now, referring to FIG. 1A, 2, and 2C, description is, at first, made as regards a number of terms and elements used for explaining the present invention.

A triangle is defined by three vertex points P0, P1, and P2. Each vertex point is defined by a coordinate triplet (x, y, z) 14. A color triplet (r, g, b) 15 is also associated with each vertex, where r, g, b is an abbreviation of Red, Green, and Blue. The coordinate triplets and color triplets for the vertexes P0, P1, and P2 are defined as follows:

Vertex P0: (x0, y0, z0) and (r0, g0, b0)
Vertex P1: (x1, y1, z1) and (r1, g1, b1)
Vertex P2: (x2, y2, z2) and (r2, g2, b2)

Three edges L01, L02, and L12 connect the three vertex points P0, P1, and P2. The range of a coordinate or a color for a given edge is defined as the coordinate span or the color span, respectively.

Referring now to FIGS. 2A, 2B and 2C, description proceeds to a detailed explanation of the spans. As regards the x-coordinate, three coordinate spans are defined as Xspan0 16, Xspan1 17, and Xspan2 18. For the y-coordinate, three coordinate spans are defined as Yspan0 19, Yspan1 20, and Yspan2 21. Regarding the z-coordinate, three coordinate spans are defined as Zspan0 22, Zspan1 23, and Zspan2 24. As regards the r-color, three color spans are defined as Rspan0 25, Rspan1 26, and Rspan2 27. For the g-color, three color spans are defined as Gspan0 31, Gspan1 32, and Gspan2 33. Finally, regarding the b-color, three color spans are defined as Bspan0 28, Bspan1 29, and Bspan2 30.

In the interim, the coordinate spans for the coordinates (x, y, z) and the color spans for the colors (r, g, b) are defined as follows:

| xspan0 = x1 − x0 | yspan0 = y1 − y0 | zspan0 = z1 − z0 |
| xspan1 = x2 − x1 | yspan1 = y2 − y1 | zspan1 = z2 − z1 |
| xspan2 = x2 − x0 | yspan2 = y2 − y0 | zspan2 = z2 − z0 |
| rspan0 = r1 − r0 | gspan0 = g1 − g0 | bspan0 = b1 − b0 |
| rspan1 = r2 − r1 | gspan1 = g2 − g1 | bspan1 = b2 − b1 |
| rspanr = r2 − r0 | gspan2 = g2 − g0 | bspan2 = b2 − b0 |

Referring to FIG. 3, description will proceed to a method of polygon rendering according to the embodiment of the present invention.

First, each triangle is prepared in a known manner to be rendered (step 101). The coordinate and the color spans are then calculated for all three edges L01, L02, and L12 (step 102). Further, all the spans except for the z-span are prepared in a known manner (step 103). Thereafter, the absolute value of the span is compared with the threshold value 128 (step 104). If the absolute value of the span is larger than or equal to the threshold value 128, 32 bit resolution is applied to interpolation thereof (step 105). On the contrary, if the absolute value of the span is less than the threshold value 128, it is checked whether this is the last span (step 106). In case it is the last span, 16 bit resolution is applied to the interpolation thereof (step 107). On the contrary, if it is not the last span, turning to the step 103, as depicted by the arrow line in FIG. 3, a next span is examined in a similar manner. On the other hand, 32 bit resolution is always applied to z-interpolation, since the z-span is generally larger than the above-mentioned threshold value 128.

Figure 4:
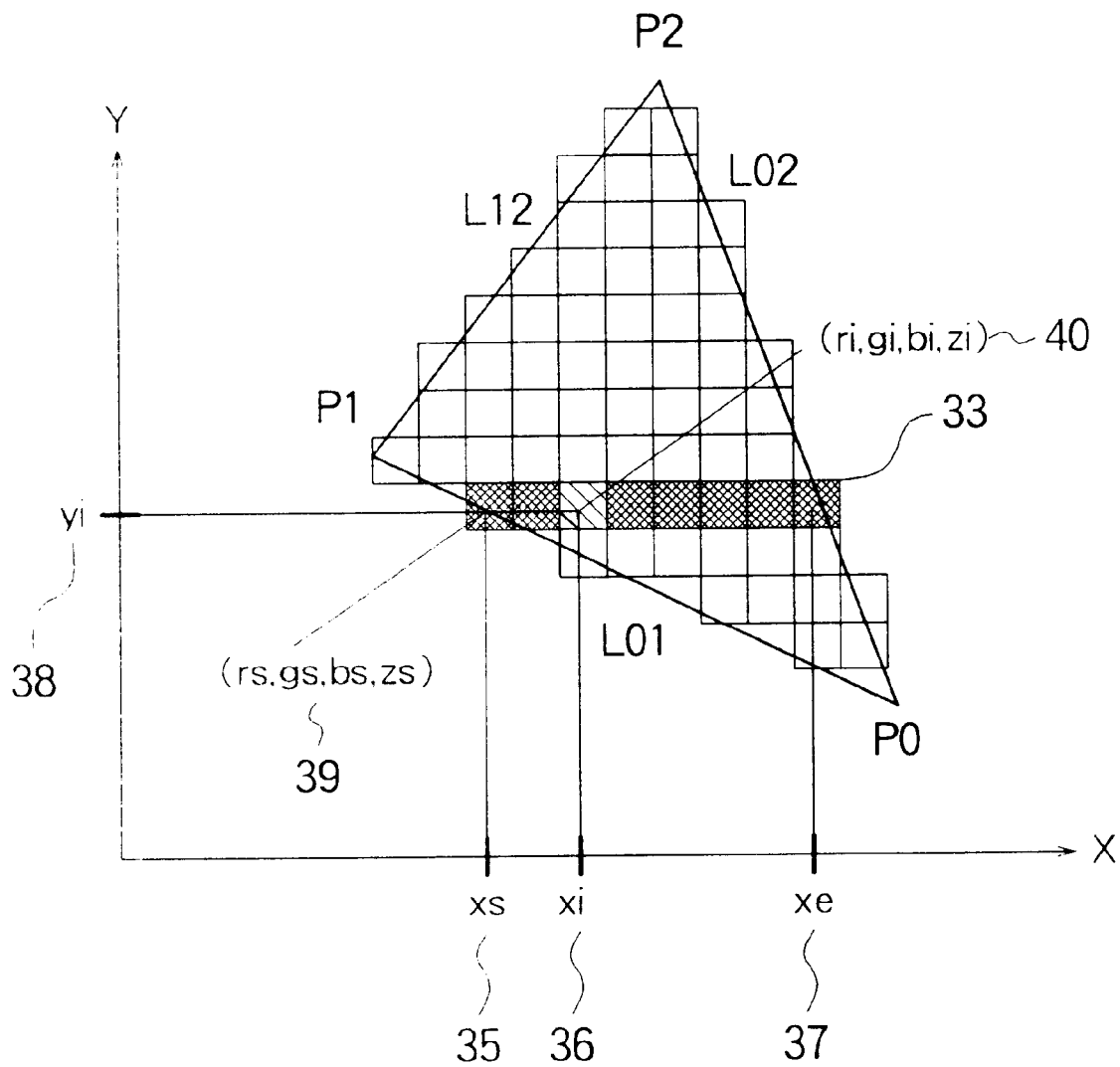
FIG. 4 is a view illustrating two-dimensional pixel interpolation in the method of polygon rendering illustrated in FIG. 3.

Referring to FIG. 4, detailed description is made as regards the aforesaid polygon rendering process.

Herein, the function of the polygon rendering is a two-dimensional interpolation of the r-color, g-color, and b-color values and the z-coordinate value across a triangle as defined by the three vertex points P0, P1, and P2. It is assumed that the three vertex points P0, P1, and P2 are sorted according to their y-coordinate, such that the condition y0<y1<y2 is satisfied. In the illustrated example, it is assumed that x1<x0 and x1<x2. The interpolation is divided into two parts, namely, edge interpolation and plane interpolation.

At first, the edge interpolation is explained. The y-axis is defined as the major axis and the x-coordinate value can be found for each y-coordinate value along the three edges L01, L02, and L12 by the edge interpolation, as illustrated in FIG. 4. Thus, for each pixel line 33, the interval of x is defined by xs 35 on edge L01 and xe 37 on edge L02. The starting value of the r-color, g-color, and b-color and the z-coordinate (rs, gs, bs, zs) 39 can be found, for each y-coordinate value, along the two edges L01 and L12 by the edge interpolation.

The above-mentioned edge interpolation is implemented by a digital differential analyzer (DDA) method.

Referring now to FIGS. 5A–5E with continued reference to FIG. 4, the DDA method will be described.

Figure 5A:
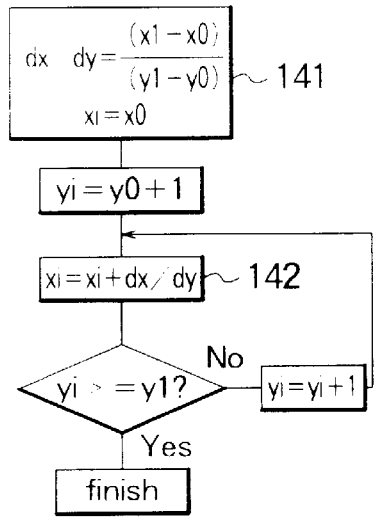
FIG. 5A is a flow chart illustrating edge interpolation of X-coordinate along L01 starting in vertex P0 and end in vertex P1.
Figure 5B:
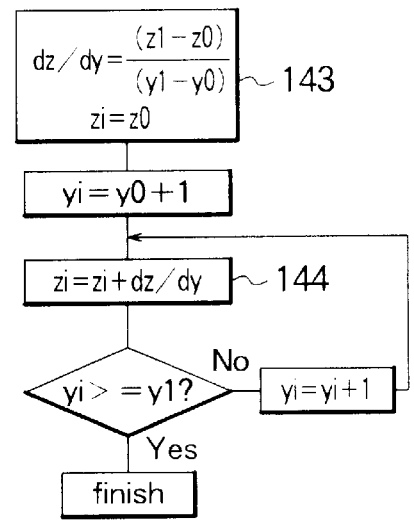
FIG. 5B is a flow chart illustrating edge interpolation of Z-coordinate along L1 starting in vertex P0 and end in vertex P1.
Figure 5C:
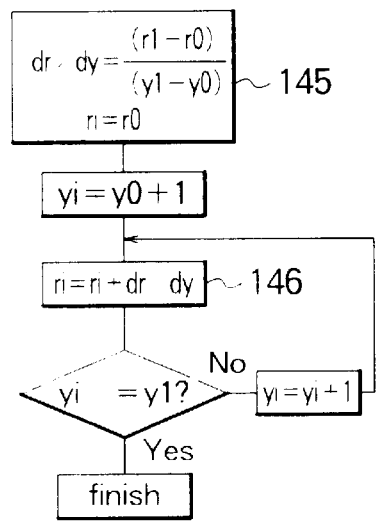
FIG. 5C is a flow chart illustrating edge interpolation of R-coordinate along L01 starting in vertex P0 and end in vertex P1.
Figure 5D:
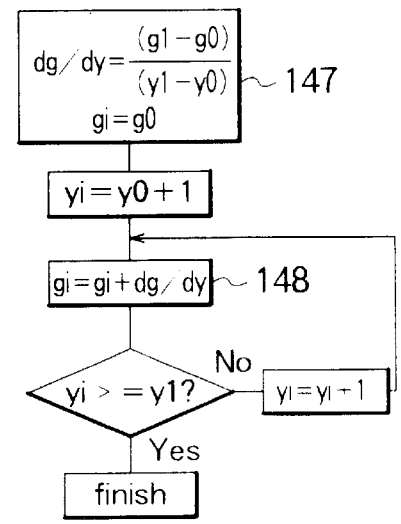
FIG. 5D is a flow chart illustrating edge interpolation of G-coordinate along L01 starting in vertex P0 and end in vertex P1.
Figure 5E:
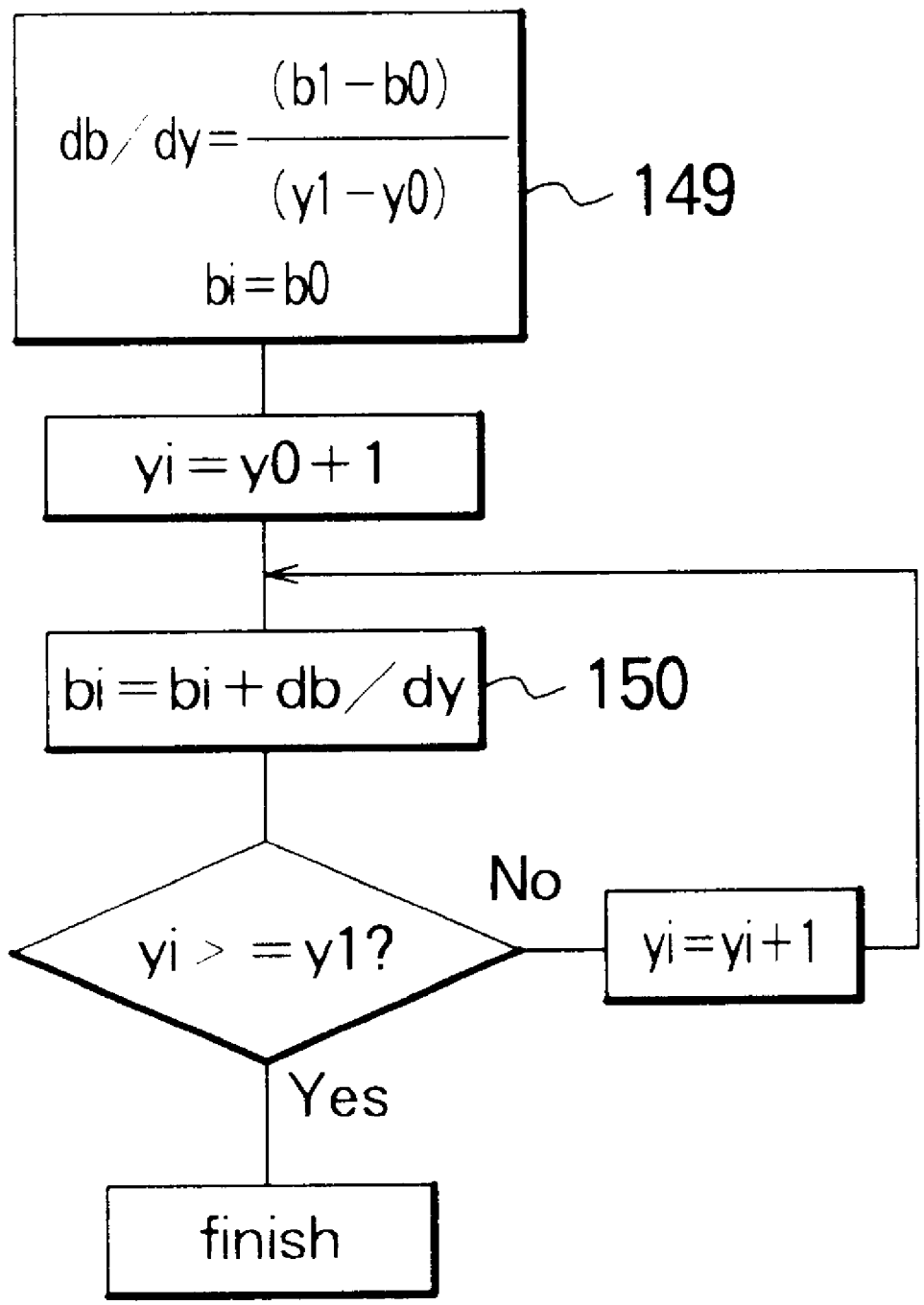
FIG. 5E is a flow chart illustrating edge interpolation of B-coordinate along L01 starting in vertex P0 and end in vertex P1.

In FIG. 5A, shown is a flow chart of the edge interpolation of the x-coordinate along L01 starting in the vertex P0 and ending in vertex P1. The differential value dx/dy is calculated and the x-value xi is initialized in the Setup function 141. Hereafter, the y-value yi is initialized to y0+1 and a loop is entered where yi is incremented by 1 for each iteration, until yi becomes larger than or equal to y1. For each iteration of yi, xi is incremented by dx/dy in the Scan function 142.

In FIGS. 5B to 5E, shown are the flow charts of the edge interpolation of the value of the z-coordinate and the r-color, g-color, and b-color, respectively.

The four edge interpolations are all performed along L01 starting in the vertex P0 and ending in vertex P1. The Setup and Scan functions for the z-coordinate are shown in the steps 143 and 144, respectively. The Setup and Scan functions for the r-color are shown in the steps 145 and 146, respectively. The Setup and Scan functions for the g-color are shown in the steps 147 and 148, respectively. The Setup and Scan functions for the b-color are shown in the steps 149 and 150, respectively.

FIGS. 5A to 5E show the edge interpolation of along L01 starting in the vertex P0 and ending in vertex P1.

The Setup functions defined in 141, 143, 145, 147, and 149 are represented by the following equations (1) to (5).

$$\frac{dx_{L01}}{dy} = \frac{x1 - x0}{y1 - y0} \quad (1)$$

$$\frac{dz_{L01}}{dy} = \frac{z1 - z0}{y1 - y0} \quad (2)$$

$$\frac{dr_{L01}}{dy} = \frac{r1 - r0}{y1 - y0} \quad (3)$$

$$\frac{dg_{L01}}{dy} = \frac{g1 - g0}{y1 - y0} \quad (4)$$

$$\frac{db_{L01}}{dy} = \frac{b1 - b0}{y1 - y0} \quad (5)$$

The Scan functions defined in 142, 144, 146, 148, and 150 are represented by the following equations (6) to (10).

$$xi_{L01} = xi_{L01} + \frac{dx_{L01}}{dy} \quad (6)$$

$$zi_{L01} = zi_{L01} + \frac{dz_{L01}}{dy} \quad (7)$$

$$ri_{L01} = ri_{L01} + \frac{dr_{L01}}{dy} \quad (8)$$

$$gi_{L01} = gi_{L01} + \frac{dg_{L01}}{dy} \quad (9)$$

$$bi_{L01} = bi_{L01} + \frac{db_{L01}}{dy} \quad (10)$$

The Setup functions for edge L12 starting in vertex P1 and ending in vertex P2 are represented by the following equations (11) to (15).

$$\frac{d x_{L12}}{d y} = \frac{x2 - x1}{y2 - y1} \quad (11)$$

$$\frac{d z_{L12}}{d y} = \frac{z2 - z1}{y2 - y1} \quad (12)$$

$$\frac{d r_{L12}}{d y} = \frac{r2 - r1}{y2 - y1} \quad (13)$$

$$\frac{d g_{L12}}{d y} = \frac{g2 - g1}{y2 - y1} \quad (14)$$

$$\frac{d b_{L12}}{d y} = \frac{b2 - b1}{y2 - y1} \quad (15)$$

The Scan functions for edge L12 starting in vertex P1 and ending in vertex P2 are represented by the following equations (16) to (20).

$$xi_{L12} = xi_{L12} + \frac{d x_{L12}}{d y} \quad (16)$$

$$zi_{L12} = zi_{L12} + \frac{d z_{L12}}{d y} \quad (17)$$

$$ri_{L12} = ri_{L12} + \frac{d r_{L12}}{d y} \quad (18)$$

$$gi_{L12} = gi_{L12} + \frac{d g_{L12}}{d y} \quad (19)$$

$$bi_{L12} = bi_{L12} + \frac{d b_{L12}}{d y} \quad (20)$$

The Setup functions for edge L02 starting in vertex P0 and ending in vertex P2, only the end value xe 37 is required as the following equation (21).

$$\frac{d x_{L02}}{d y} = \frac{x2 - x0}{y2 - y0} \quad (21)$$

The corresponding Scan function is represented by the following equation (22).

$$xi_{L02} = xi_{L02} + \frac{d x_{L02}}{d y} \quad (22)$$

Turning to FIG. 4, description is made about the aforesaid plane interpolation.

The edge interpolation provides the start value xs 35, the end value xe 37, start values of the r-color, g-color, and b-color and the z-coordinate (rs, gs, bs, zs) 39. In order to find the current pixel (ri, gi, bi, zi) 40, the r-color, g-color, and b-color and the z-coordinate are interpolated across each pixel line 33, the differential values for each color and the z-coordinate are found. A triangle is a plane and is defined by the following implicit equation $$\begin{pmatrix} a \\ b \\ c \end{pmatrix} = L_{01} \times L_{02} = \begin{pmatrix} y_{L01} z_{L02} - z_{L01} y_{L02} \\ z_{L01} x_{L02} - x_{L01} z_{L02} \\ x_{L01} y_{L02} - y_{L01} x_{L02} \end{pmatrix}$$

where (a, b, c) is the normal vector to the plane defined as:

$$L_{01} = \begin{pmatrix} x_{L01} \\ y_{L01} \\ z_{L01} \end{pmatrix} = P_1 - P_0 = \begin{pmatrix} x1 - x0 \\ y1 - y0 \\ z1 - z0 \end{pmatrix}$$

and $$L_{02} = \begin{pmatrix} x_{L02} \\ y_{L02} \\ z_{L02} \end{pmatrix} = P_2 - P_0 = \begin{pmatrix} x2 - x0 \\ y2 - y0 \\ z2 - z0 \end{pmatrix}$$

Thus, the z-value can be expressed by the following equation:

$$z(x, y) = -\frac{ax + by + d}{c}$$

and the differential value of the z-coordinate for an increasing x-value is given as the following equation (23):

$$\frac{dz}{dx} = -\frac{a}{c} = -\frac{y_{L01} z_{L02} - z_{L01} y_{L02}}{x_{L01} y_{L02} - y_{L01} x_{L02}} \quad (23)$$

As regards the colors r, g, and b, they are given as the following equations (24), (25) and (26):

$$\frac{dr}{dx} = -\frac{a_r}{c} = -\frac{y_{L01} r_{L02} - r_{L01} y_{L02}}{x_{L01} y_{L02} - y_{L01} x_{L02}} \quad (24)$$

$$\frac{dg}{dx} = -\frac{a_g}{c} = -\frac{y_{L01} g_{L02} - g_{L01} y_{L02}}{x_{L01} y_{L02} - y_{L01} x_{L02}} \quad (25)$$

$$\frac{db}{dx} = -\frac{a_b}{c} = -\frac{y_{L01} b_{L02} - b_{L01} y_{L02}}{x_{L01} y_{L02} - y_{L01} x_{L02}} \quad (26)$$

Figure 6:
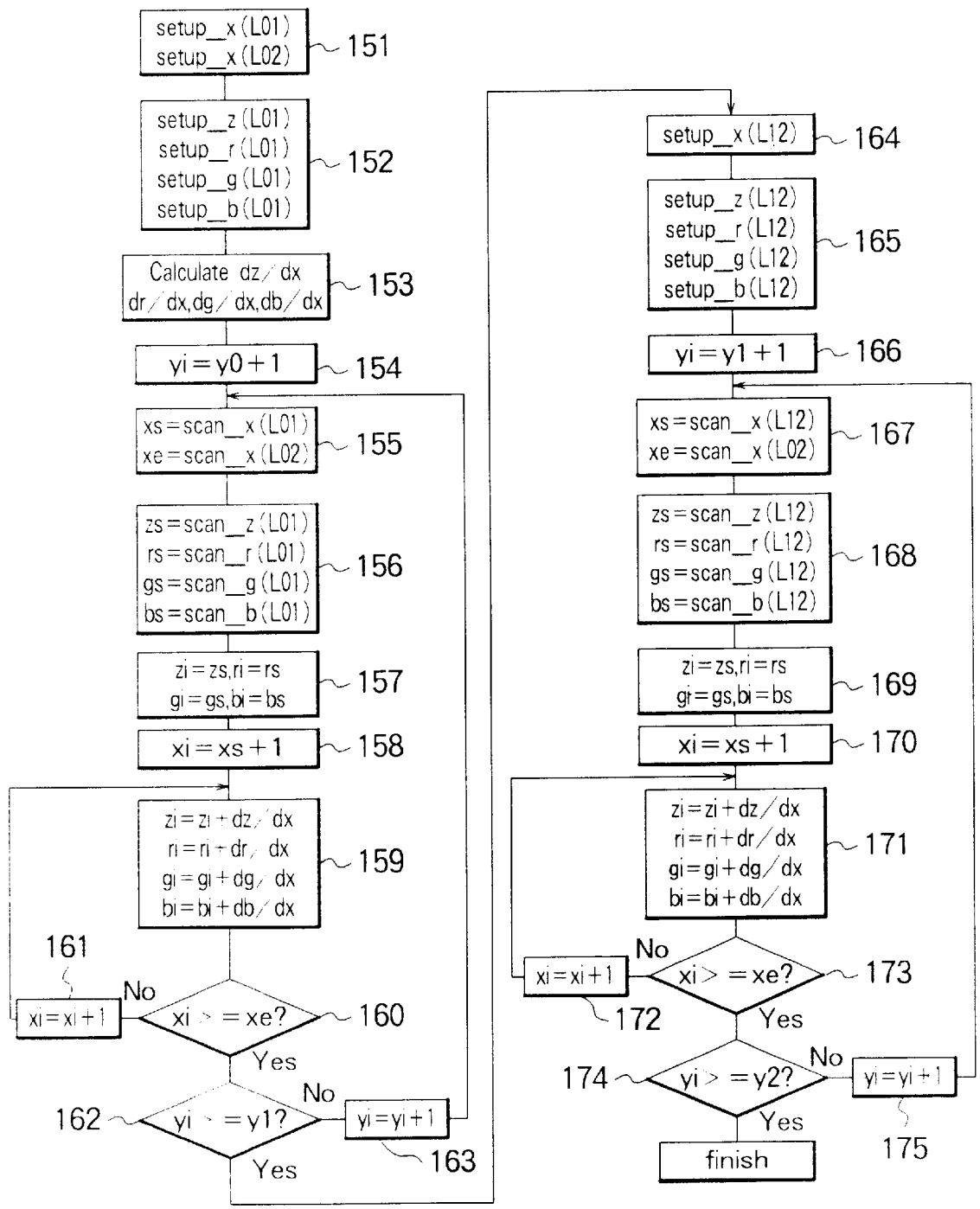
FIG. 6 is a flow chart for explaining a complete two-dimensional interpolation algorithm in the method of polygon rendering illustrated in FIG. 3.

Referring to FIG. 6 with reference to FIG. 4 continued, description is made as regards a complete two-dimensional interpolation algorithm in the method of polygon rendering according to the embodiment of the present invention.

The interpolation of x-coordinate along the edges L01 and L02 are setup in the step 151 by the use of the above-mentioned equations 1 and 21, respectively. The interpolation of the z-coordinate and the colors r, g, and b along the edge L01 are setup in the step 152 by the use of the above-mentioned equations 2, 3, 4, and 5, respectively. The differential value for the z-coordinate and the colors r, g, and b for an increasing x-value are calculated in the step 153 by the use of the above-mentioned equations 23, 24, 25, and 26. The yi 38 is initialized to y0+1 in the step 154. In the step 155, the start and end value of x is calculated by the Scan function defined in the above-mentioned equations 6 and 22, respectively. The step 155 constitutes the beginning of the y loop. In the step 156, the start values zs, rs, gs, and bs are calculated by the Scan function defined by the above-mentioned equations 7, 8, 9, and 10. The current values zi, ri, gi, and bi are initialized to the start values zs, rs, gs, and bs in the step 157. The xi 36 is initialized to xs+1 in the step 158. In the step 159, the current values zi, ri, gi, bi are increased by dz/dx, dr/dx, dg/dx and db/dx, respectively. The step 159 constitutes the beginning of the x loop. If the xi is less than the xe, as depicted in the step 160, the xi is increased by 1, as depicted in the step 161 and from 159 is repeated. Otherwise, the algorithm goes to the step 162 and tests whether yi is less than y1. If the yi is less than y1, yi is increased by 1, as depicted in the step 163 and from 155 is repeated. Otherwise, the algorithm has finished the rendering process of the first half of the triangle.

Next, the interpolation of the x-coordinate along the edge L12 is setup in the step 164 by the use of the above-mentioned equation 11. The interpolation of the z-coordinate and the colors r, g, and b along the edge L12 are setup in the step 165 by the use of the above-mentioned equations 12, 13, 14, and 15, respectively. The yi is initialized to yl+1 in the step 166. In the step 167, the start and the end values of x are calculated by the Scan function defined in the above-mentioned equations 16 and 22, respectively. The step 167 constitutes the beginning of the y loop. In the step 168, the start values zs, rs, gs, and bs are calculated by the Scan function defined in the above-mentioned equations 17, 18, 19, and 20. The current values zi, ri, gi, and bi are initialized to the start values zs, rs, gs, and bs in the step 169. The xi is initialized to xs+1 in the step 170. In the step 171, the current values zi, ri, gi, and bi are increased by dz/dx, dr/dx, dg/dx, and db/dx, respectively. The step 171 constitutes the beginning of the x loop. If the xi is less than the xe, as depicted in the step 173, the xi is increased by 1 in the step 172 and from the step 171 is repeated. Otherwise, the algorithm goes to the step 174 and tests whether yi is less than y2. If yi is less than y2, yi is increased by 1 in the step 175 and from the step 167 is repeated. Otherwise, the algorithm has finished the rendering process of the second half of the triangle.

The above-described bit resolution, which is selected by the algorithm shown in FIG. 3, is applied to the above-mentioned equations 1 to 26, except for the equations 2, 7, 12, 17 and 23 which include z-spans.

Figure 7:
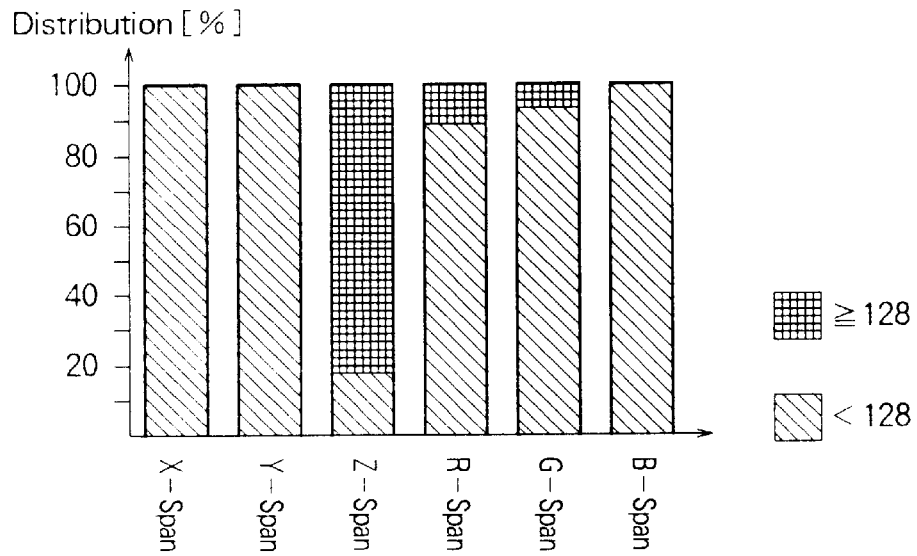
FIG. 7 is a graph illustrating the distribution of span size.

Referring to FIG. 7, description is made about distribution of the span size for a typical computer graphics scene.

In FIG. 7, it can be understood that 90% of the spans are small, except for the z-span. Thus, for processing including the z-span, 32 bit resolution is always applied. This means that for all triangles where all spans, z-span not included, are less than the aforesaid threshold value 128, 16 bit resolution can be applied, while for the remaining triangles, 32 bit resolution should be applied.

Figure 8:
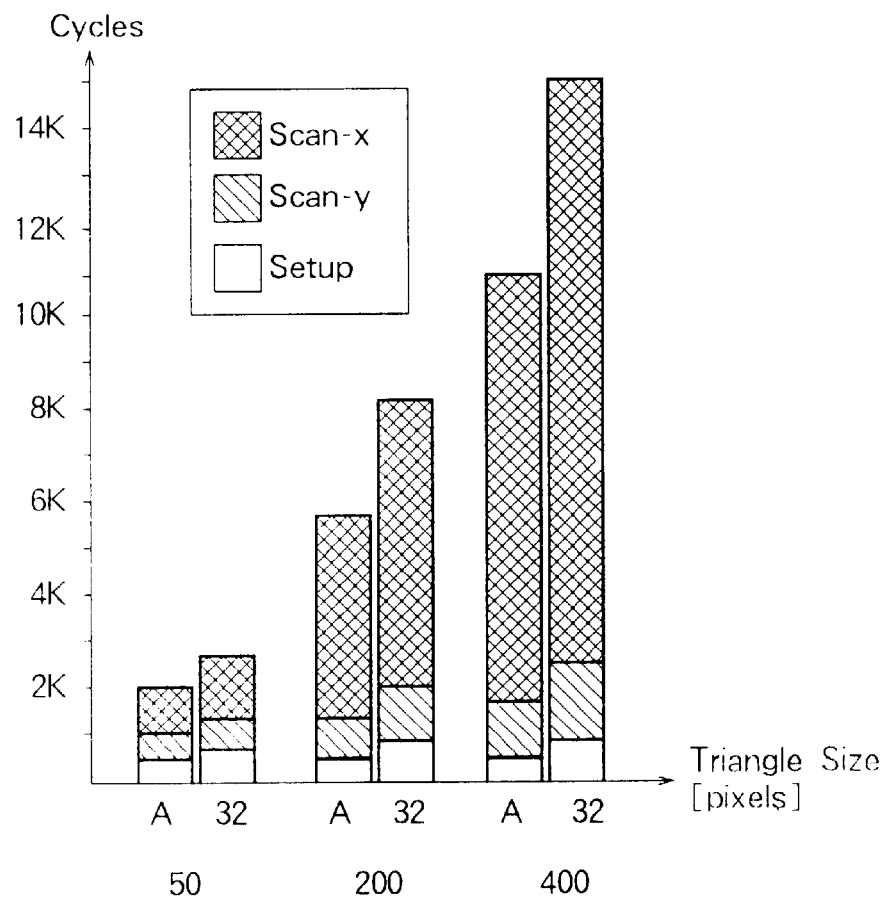
FIG. 8 is a graph for illustrating the effectiveness of the method of polygon rendering according to the preferred embodiment of the present invention.

Referring to FIG. 8, description is made as regards the advantageous effect of the method of polygon rendering of the present invention.

In FIG. 8, shown is a result of the estimation of the required number of processor cycles, when a 16 bit fixed-point digital signal processor (DSP) is applied for implementation of the described rendering. Besides, $\mu$ PD77016 (NEC Corporation, "$\mu$ PD77016 Digital Signal Processor", User's Manual, August 1993) is employed as the 16 bit fixed-point DSP.

The y axis shows the required number of cycles, the x axis is triangle size given in pixels. Three clusters of columns are shown for the triangle size of 50, 200, and 400 pixels. Each cluster consists of two columns. Each left column shows the cycle count for the method of the present invention. Each right column shows the cycle count for 32 bit resolution. In the graph illustrated in FIG. 8, it can be understood that 30% less processor cycles are required for the method of the present invention, compared with constantly applying 32 bit resolution. In other words, the total number of processing cycles can be reduced by 30% for a 16 bit DSP architecture.

As described above, in many computer graphics scenes, the majority of the coordinate and color spans are small. Thus, low bit resolution offers sufficient accuracy for the interpolation of the four axes Z, Red, Green, and Blue. By using smaller word size, the required processing cycles can be reduced and interpolation process is able to be accelerated.

While this invention has thus far been described in specific conjunction with a preferred embodiment thereof, it will now be readily possible for one skilled in the art to put this invention into effect in various other manners. For example, although the first and the second bit resolutions are 32 and 16 bit resolutions in the preferred embodiment, they are not restricted to 32 and 16. Namely, it is enough that a suitable bit width is selected for the rendering by evaluating the coordinate and color spans of each triangle. Further, the predetermined threshold value is not limited to 128.

What is claimed is:

1. A method of adaptive polygon rendering, where an applied fixed-point bit resolution is adapted to the size of the polygon, said method comprising the steps of:

calculating coordinate and color spans of said polygon, where said coordinate spans are the range of the X, Y, and Z axes within which the polygon is defined and where said color spans are the range of the Red, Green, and Blue axes within which the polygon is defined;

comparing each of said coodinateand color spans with a predetermined threshold value;

applying a first bit resolution to said adaptive polygon rendering, if one of said coordinate and color spans is above or equal to said predetermined threshold value; and applying a second bit resolution lower than said first bit resolution to said adaptive polygon rendering, if each of said coordinate and color spans is below said predetermined threshold value.

2. A method of adaptive polygon rendering as recited in claim 1, further comprising interpolation of the four axes Z, Red, Green, and Blue across said polygon.

3. A method of adaptive polygon rendering as recited in claim 1, wherein said predetermined threshold value is 128, said first bit resolution is 32 bit resolution and said second bit resolution is 16 bit resolution.

4. A method of adaptive polygon rendering as recited in claim 2, wherein said predetermined threshold value is 128, said first bit resolution is 32 bit resolution and said second bit resolution is 16 bit resolution.

* * * * *